United States Patent [19]
Glenn

[11] Patent Number: 4,488,000
[45] Date of Patent: Dec. 11, 1984

[54] APPARATUS FOR DETERMINING POSITION AND WRITING PRESSURE

[75] Inventor: William E. Glenn, Ft. Lauderdale, Fla.

[73] Assignee: New York Institute of Technology, Old Westbury, N.Y.

[21] Appl. No.: 429,785

[22] Filed: Sep. 30, 1982

[51] Int. Cl.³ .............................................. G08C 21/00
[52] U.S. Cl. ...................................................... 178/18
[58] Field of Search ..................................... 178/18, 19

[56]        References Cited
       U.S. PATENT DOCUMENTS 3,692,936  9/1972  Moffitt ................................. 178/18
    3,790,709  2/1974  Heywang ............................ 178/18

Primary Examiner—Stafford D. Schreyer
Attorney, Agent, or Firm—Martin Novack

[57]                ABSTRACT

The disclosure is directed to an apparatus for determining position in a data space. A generally flat tablet is provided, the tablet being formed of a solid acoustically-conductive material. A movable element, such as a stylus, is adapted to be manually movable over the tablet surface, the movable element having a tapered tip which contacts the surface of the tablet. An acoustic transducer is coupled to the tip of the movable element. Fixed transducer means are coupled to the tablet. Means are provided for energizing acoustic energy to propagate in either direction between the transducer of the movable element and the fixed transducer means. The midrange frequency of the energy is selected such that the wavelength of the energy mode propagating parallel to the tablet surface is a function of the tablet thickness. Means are provided for determining the time of propagation of the acoustic energy travelling, in either direction, between the transducer of the movable element and the fixed transducer means. Each time of propagation is indicative of a coordinate position of the movable element. The pressure of the stylus tip on the tablet controls the amplitude of transmitted or received (as the case may be) acoustic energy. Accordingly, the stylus pressure can be determined from the measured amplitude.

16 Claims, 2 Drawing Figures

APPARATUS FOR DETERMINING POSITION AND WRITING PRESSURE

BACKGROUND OF THE INVENTION

This invention relates to position determination apparatuses and, more particularly, to an apparatus for locating the position of a movable element in a data space. The apparatus also determines writing pressure, which can be used to convey information such as the desired width of hand-drawn lines. The subject matter hereof is related to subject matter in copending U.S. application Ser. No. 430,253, filed of even date herewith and assigned to the same assignee as the present application.

Graphical data systems are in widespread use for determining the position of a movable element in a data space. These equipments have many uses, the most common of which is for entering coordinate information into a computer or other processor. For example, digitizer systems are utilized to enter hand-drawn lines into a computer, to denote the positions of coordinates on a map that overlays a data area, to recognize hand-drawn characters, or to denote selected check-box areas on a worksheet. There are many other uses and potential uses as well, such as in conjunction with video games.

An early form of graphical digitizer employed a writing pen or pointer mechanically coupled to a set of arms for translating the movement of the pen into a sequence of useable information signals. More recently, graphical digitizers have been developed which are based on the principle of determining the propagation time of energy between a movable element and fixed coordinate references. Various types of energy and transmission media have been employed. In one system, a stylus generates periodic soundwaves, and circuitry is provided which measures the transit time of the soundwaves travelling through the air to spaced microphones. Since the speed of sound in air is essentially a known quantity, the coordinates of the stylus are readily determinable. Other types of systems use transmission through magnetostrictive wires or employ a resistive matrix.

In another type of system, a solid platen or tablet of sound-conductive material, typically of rectangular shape, is employed. A stylus includes a source of acoustic energy and a tip which couples the soundwave energy into the solid platen. Sound sensing transducers are disposed along to adjacent edges of the platen, and are coupled to circuitry which can be used to obtain the x and y coordinates of the stylus by determining the travel time of the sound energy in the platen between the stylus and the sensors. This type of digitizer has certain advantages and disadvantages. Among the advantages is that the acoustic energy travels with relatively high efficiency through the solid sheet, and interfering objects or noise in the environment will not likely cause a problem. Also, the surface of a video display can be used as the tablet. However, there is a substantial problem in efficiently coupling the acoustic energy into the tablet and also in efficiently and inexpensively sensing the acoustic energy at the edges of the tablet. Difficulties have been encountered in launching the sound energy into the solid platen such that it radiates symetrically and with high efficiency, regardless of the angle of the stylus.

It is among the objects of the present invention to provide improvements in the type of digitizer that employs a solid sheet for transmission of acoustic energy.

SUMMARY OF THE INVENTION

The present invention is directed to an apparatus for determining position in a data space. A generally flat tablet is provided, the tablet being formed of a solid acoustically-conductive material. A movable element, such as a stylus, is adapted to be manually movable over the tablet surface, the movable element having a tapered tip which contacts the surface of the tablet. An acoustic transducer is coupled to the tip of the movable element. Fixed transducer means are coupled to the tablet. Means are provided for energizing acoustic energy to propagate in either direction between the transducer of the movable element and the fixed transducer means. The midrange frequency of the energy is selected such that the wavelength of the energy mode propagating parallel to the tablet surface is a function of the tablet thickness, so as to optimize coupling into or out of the tablet. Means are provided for determining the time of propagation of the acoustic energy travelling, in either direction, between the transducer of the movable element and the fixed transducer means. Each time of propagation is indicative of a coordinate position of the movable element.

In a first type of operation, the energy mode propagating parallel to the tablet surface is compressional mode energy, and the frequency is selected such that the wavelength of the compressional mode energy is about (where "about" is intended herein to mean plus or minus fifty percent) four times the thickness of the tablet. In this first type of operation, the energy coupled into the tablet thickness is shear mode energy (at a wavelength of about twice the tablet thickness), which causes the compressional mode wave to be launched parallel to the tablet surface.

In a second type of operation, the energy mode propagating parallel to the tablet surface is shear mode energy, and the frequency is selected such that the wavelength of the shear mode energy is about the same as the thickness of the tablet. In this second type of operation, the energy coupled into the tablet thickness is compression mode energy, which causes the shear mode wave to be launched parallel to the tablet surface.

By employing the operating frequencies hereof, applicant has found that the acoustic energy can more efficiently be launched or received from the tablet, and there is less dependance on having a consistent angle of the tip of the movable element.

In the preferred embodiment of the invention, the tablet is formed of plastic and the fixed transducer means are strips of piezoelectric plastic. In this embodiment, the tip of the stylus is horn-shaped and the material of the tip has an acoustic impedance which is between the acoustic impedance of the piezoelectric transducer and the acoustic impedance of the tablet material. This further facilitates coupling of acoustic energy between the stylus tip and the tablet.

In a form of the invention, means are provided for determining the amplitude of the acoustic energy which has propagated through the tablet. The pressure of the stylus tip on the tablet controls the amplitude of transmitted or received (as the case may be) acoustic energy. Accordingly, the stylus pressure can be determined from the measured amplitude. The writing pressure can be used to convey information such as the thickness of lines being hand drawn. Adjustment of the amplitude based on the distance travelled through the tablet is achieved using a time-gain compensation technique.

Further features and advantages of the invention will become more readily apparent from the following detailed description when taken in conjunction with the accompanying drawings.

DESCRIPTION OF THE PREFERRED EMBODIMENT

Figure 1:
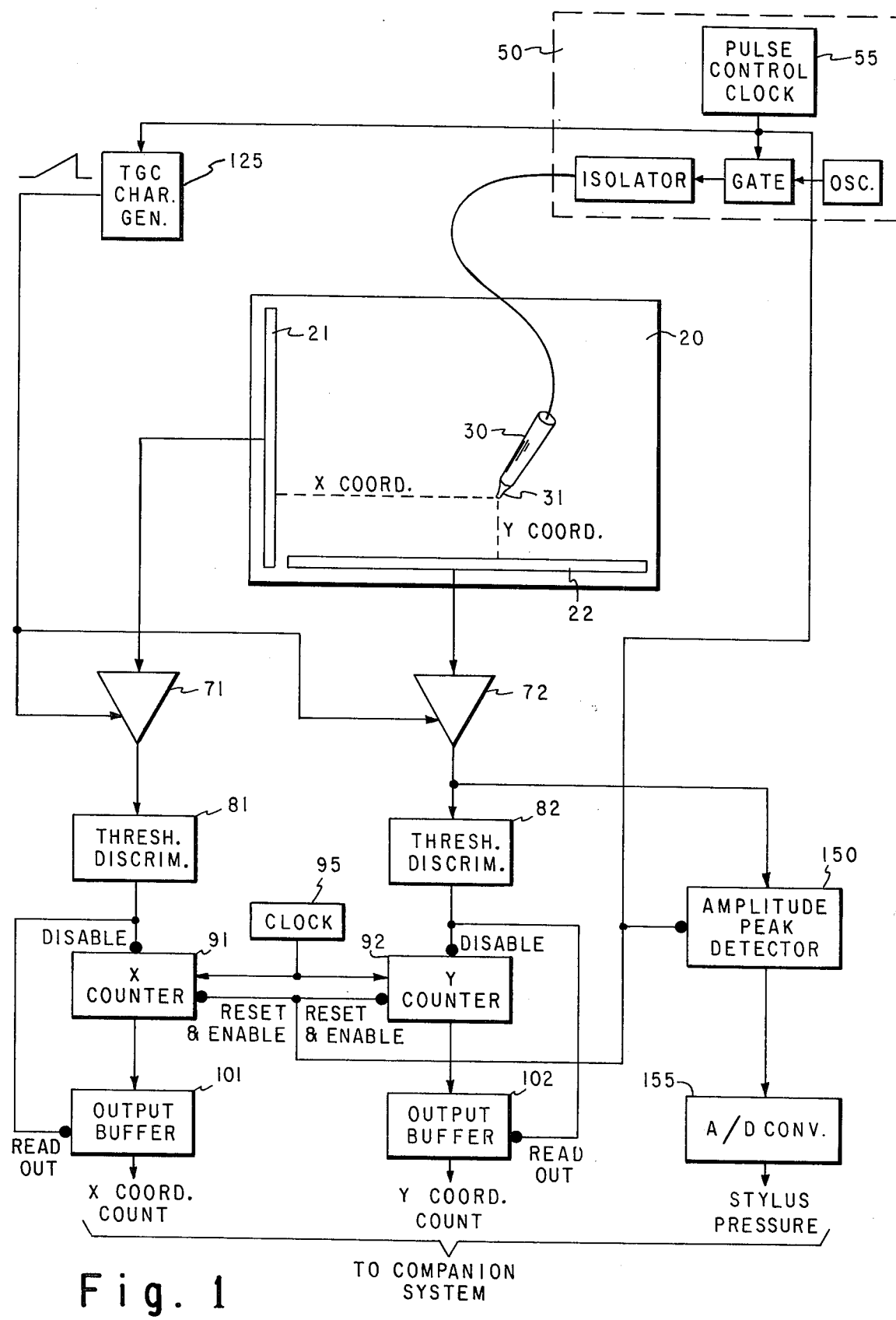
FIG. 1 is a block diagram, partially in schematic form, of a graphical data apparatus in accordance with an embodiment of the invention.

Referring to FIG. 1, there is shown an embodiment of a graphical digitizer apparatus in accordance with the invention. A data surface 20 comprises a generally rectangular sheet or tablet of solid acoustic-conductive material. In the present preferred embodiment, a plastic such as polystyrene is used to advantage. However, other solid materials, such as glass, can be used. Disposed along the edges of the top surface of the tablet 20 are a pair of elongated transducers, an x-sensing transducer 21, and a y-sensing transducer 22. In the present embodiment, the transducers are preferably a piezoelectric plastic material, such as strips of polyvinyladine fluoride. These inexpensive transducers are secured to the surface with a plastic adhesive.

Figure 2:
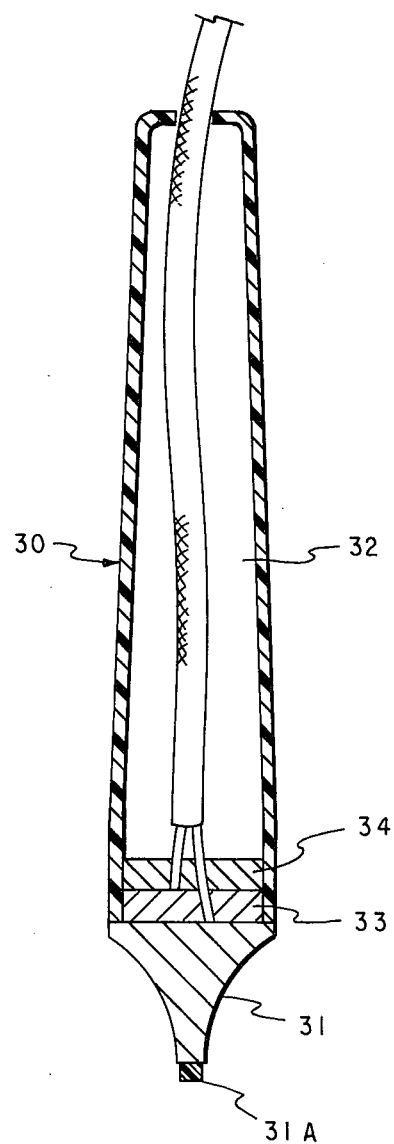
FIG. 2 is a cross-sectional representation of the stylus of the FIG. 1 embodiment.

A movable element 30, which is illustrated as being a stylus in the present embodiment, is movable over the tablet and has a tip 31 which contacts the tablet and can be used to draw or designate lines or points on the data surface. The stylus, shown in further detail in FIG. 2, includes an elongated plastic pen-like body 32 having a wafer 33 of piezoelectric material, such as lead metaniobate, mounted near the bottom thereof and beneath an acoustic absorber 34. A hornshaped tip 31 is secured to the bottom of the transducer 31, such as with a plastic adhesive. The material of the hornshaped tip 31 preferably has an acoustic impedance that is between the acoustic impedance of the transducer 33 and the acoustic impedance of the plastic tablet 20. In the present embodiment an aluminum tip is used. A contact 31A, formed of a resilient material such as Teflon, can be employed to facilitate sliding of the tip on the tablet surface.

Energizing wires, coupled to the transducer, pass through the stylus body. These wires are coupled to energizing means shown in dashed enclosure 50. The output of a high frequency oscillator 51 is coupled, via gate 51 and isolator 52, to the stylus transducer 33. The gate 52, which may be a solid state switch, receives periodic pulses from the pulse control clock 55. Accordingly, the transducer 33 is periodically energized at the pulse control clock rate.

The x and y sensing transducers 21 and 22 are coupled to amplifiers 71 and 72, respectively. The outputs of amplifiers 71 and 72 are respectively coupled to threshold discriminator circuits 81 and 82 which, as known in the art, are operative to consistently detect the first arrival of the acoustic signal at the transducers.

The pulse control clock signal which is operative to enable the gate 52 is also applied to the reset and enable terminals of an x counter 91 and a y counter 92. Clock pulses from a basic clock 95 are counted by the counters 91 and 92 upon being enabled. The output of threshold discriminators 81 and 82 are respectively coupled to the disable terminals of x counter 91 and y counter 92. The outputs of these counters are respectively coupled to output buffers 101 and 102 which are enabled to read out the counter values by the same signal which disables the counters. The buffer outputs are typically coupled to a computer or other companion system.

In operation, each time the pulse control clock 55 allows the gate to pass an energizing signal to the transducer 33, the x counter 91 and the y counter 92 are enabled to start counting clock pulses from the clock 95. Upon respective arrival of the acoustic energy at the x and y sensing trnasducers 21 and 22, the counters 91 and 92 are respectively disabled and their counts are caused to be read out via output buffers 101 and 102 to a companion system which utilizes the digitized x, y coordinates.

In the embodiment hereof, time-gain compensation is employed to compensate for the attenuation of the acoustic signal as it propagates through the tablet 20. As the stylus 30 moves further from a particular sensing transducer (21 or 22), the signal received would normally be weaker, as a function of distance from the sensing transducer. Accordingly, in order to have more consistent signal amplitudes in the x and y processing channels, a time-gain compensation signal is applied to control the gain of amplifiers 71 and 72. The time-gain compensation characteristic may be determined empirically, but it is illustrated as being a simple ramp in the FIG. 1 embodiment. A time-gain compensation characteristic generator 125 generates the ramp signal, the ramp being triggered by the output of the pulse control clock 55. Accordingly, the gain applied to amplifiers 71 and 72 increases as a function of time from when the energy is first injected into the tablet 20. The time-gain compensation is also useful in the amplitude-sensing feature of the invention to be described below.

The present apparatus is preferably operated at ultrasound frequencies, such as between about 200 KHz and 800 KHz. In one functioning embodiment hereof, the thickness of the polystyrene tablet was about 1 mm, and the mid-frequency of operation was about 600 KHz. This resulted in an approximately mid-wavelength in the tablet thickness direction of about 2 mm in shear mode. This energy is converted to compression mode propagation parallel to the tablet surface, with a compression mode wavelength of about 4 mm.

In accordance with a further feature of the invention, the application of the acoustic energy through the hornshaped tip 31 has pressure-sensitive characteristics that can be utilized to convey information in addition to the coordinate position of the stylus. The amount of pressure on the writing tip can be used to express various types of information. For example, when using the digitizer in a computer graphics system for entering line drawings into a computer, the pressure on the pen can be used to denote the width or thickness of the line to be entered in memory. In the embodiment of FIG. 1, the output of amplifier 72 is coupled to an amplitude peak detector 150 which is reset for each transmission by the signal from pulse control clock 55. Time-gain compensation, as described above, is applied to amplifier 72. The output of amplitude peak detector can be converted to digital form, if necessary, by analog-to-digital converter 155, and then coupled to the companion system. If desired, the amplitude of the signal received at the other transducer can also be measured and used.

The invention has been described with reference to a particular embodiment, but variations within the spirit and scope of the invention will occur to those skilled in the art. For example, while a stylus is shown, the movable element may take other forms. The embodiment hereof has been described in terms of a system wherein the stylus, cursor, or other movable element is used as a transmitter. However, it will be understood that the principles of the invention also apply when the transmission is effected from one or more fixed transducers, and reception is by the movable element. When operating in this fashion, the previously described features, such as with regard to the relationship between the tablet thickness and the frequency of operation, and also with regard to the tip structure of the movable element, yield advantages as were set forth. It can be noted, in this regard, that to prevent ambiguities when operating in "reverse mode", the x-detection and y-detection can be alternately implemented by having separate transmissions in sequence from an x transducer and a y transducer. Further, operation can be implemented with shear mode energy propagation parallel to the tablet surface by exciting compressional mode energy in the tablet thickness. Operation with the slower travelling and shorter wavelength shear mode has potential for obtaining higher resolution, but the compressional mode is presently considered to provide higher efficiency and signal-to-noise ratio. Also, each fixed transducer may comprise pairs of strips on the top and bottom of the tablet, or single strips on the tablet edge, preferably having a width of about the tablet thickness. Finally, it will be recognized that other types of fixed transducers, such as point transducers, could be employed in conjunction with computing means to determine coordinate position.

I claim:

1. Apparatus for obtaining position and writing pressure in a data space, comprising:
   a generally flat tablet formed of a solid acoustically-conductive non-piezoelectric material;
   a stylus manually movable over the tablet surface, said stylus including a piezoelectric transducer coupled to a tapered tip which contacts the surface of said tablet;
   first and second fixed acoustic transducer means coupled to said tablet;
   means for energizing acoustic energy to propagate in either direction, through the tablet, between the transducer of said stylus and said first and second fixed transducer means;
   means for determining the time of propagation of said acoustic energy travelling, in either direction, between the transducer of said stylus and each of said first and second fixed transducer means;
   means for determining the amplitude of the acoustic energy which has propagated through said tablet and tip; and
   means for adjusting said amplitude as a function of the time of travel of the acoustic energy in the tablet;
   the pressure of said stylus tip on said tablet being determined as a function of said adjusted amplitude.

2. Apparatus as defined by claim 1, wherein said tablet is formed of plastic.

3. Apparatus as defined by claim 2, wherein the tip of said stylus is horn-shaped and wherein said horn-shaped tip is formed of a material whose acoustic impedance is between the acoustic impedance of the piezoelectric transducer and the acoustic impedance of the tablet material.

4. Apparatus as defined by claim 2, wherein said acoustic energy is ultrasound energy.

5. Apparatus as defined by claim 1, wherein the tip of said stylus is horn-shaped and wherein said horn-shaped tip is formed of a material whose acoustic impedance is between the acoustic impedance of the piezoelectric transducer and the acoustic impedance of the tablet material.

6. Apparatus as defined by claim 1, wherein said acoustic energy is ultrasound energy.

7. Apparatus as defined by claim 5, wherein said acoustic energy is ultrasound energy.

8. Apparatus as defined by claim 3, wherein said acoustic energy is ultrasound energy.

9. Apparatus for obtaining position and writing pressure in a data space, comprising:
   a generally flat tablet formed of a solid acoustically conductive non-piezoelectric material;
   a stylus manually movable over the tablet surface, said stylus including a piezoelectric transducer coupled to a tapered tip which contacts the surface of said tablet;
   first and second fixed acoustic transducer means coupled to said tablet;
   means for energizing the piezoelectric transducer of said stylus to propagate acoustic energy;
   means for determining the times of propagation of said acoustic energy travelling from said stylus, through the tablet, to each of said fixed transducer means;
   means for determining the amplitude of the acoustic energy which has travelled from said stylus, through the tablet, to one of said fixed transducer means; and
   means for adjusting said amplitude as a function of the time of travel of the acoustic energy in the tablet to said one of said fixed transducer means;
   the pressure of said stylus tip on said tablet being determined as a function of said amplitude.

10. Apparatus as defined by claim 9, wherein said tablet is formed of plastic.

11. Apparatus as defined by claim 10, wherein the tip of said stylus is horn-shaped and wherein said horn-shaped tip is formed of a material whose acoustic impedance is between the acoustic impedance of piezoelectric transducer and the acoustic impedance of the tablet material.

12. Apparatus as defined by claim 10, wherein said acoustic energy is ultrasound energy.

13. Apparatus as defined by claim 9, wherein the tip of said stylus is horn-shaped and wherein said horn-shaped tip is formed of a material whose acoustic impedance is between the acoustic impedance of the piezoelectric transducer and the acoustic impedance of the tablet material.

14. Apparatus as defined by claim 13, wherein said acoustic energy is ultrasound energy.

15. Apparatus as defined by claim 9, wherein said acoustic energy is ultrasound energy.

16. Apparatus as defined by claim 11, wherein said acoustic energy is ultrasound energy.

* * * * *